Oct. 13, 1925.

C. BETHEL 1,557,008

JOURNAL BEARING CASING

Filed Sept. 22, 1923

WITNESSES:
R. S. Harrison
W. K. Jaspert

INVENTOR
Claude Bethel,
BY
Wesley S. Carr
ATTORNEY

Patented Oct. 13, 1925.

1,557,008

UNITED STATES PATENT OFFICE.

CLAUDE BETHEL, OF WILKINSBURG, PENNSYLVANIA, ASSIGNOR TO WESTINGHOUSE ELECTRIC & MANUFACTURING COMPANY, A CORPORATION OF PENNSYLVANIA.

JOURNAL-BEARING CASING.

Application filed September 22, 1923. Serial No. 664,236.

*To all whom it may concern:*

Be it known that I, CLAUDE BETHEL, a citizen of the United States, and a resident of Wilkinsburg, in the county of Allegheny and State of Pennsylvania, have invented a new and useful Improvement in Journal-Bearing Casings, of which the following is a specification.

My invention relates to railway vehicles, more especially to driving trucks of electric railway vehicles wherein the motor housings are journalled directly upon the wheel axles and constitute the truck body portion, my invention having particular reference to the details of axle-mounting bearing structure, axle housing and resilient supporting means that are embodied in the truck structure.

It is among the objects of my invention to provide a drive truck for electrically propelled railway vehicles having a novel form of axle mounting which obviates the need of standard journal boxes as heretofore utilized; which shall provide a good lubricating system for the bearing parts; which shall effect a uniform and efficient distribution of the load on the wheel axles and which shall operate efficiently under the severe service strains to which such members are subjected.

In the usual type of truck, a frame structure comprising side frames, end bolsters, tie-rods and transom members, is journalled upon the wheel axles by a plurality of journal boxes, and suitable resilient or flexible members are interposed between the frame and boxes.

In my copending application, Serial No. 664,235, filed Sept. 22, 1923, I have described a novel type of vehicle truck comprising a pair of motors journalled directly on the wheel axles without the use of side frame members, the motors having a flexible drive element that permits of certain relative movements of the associated parts. In this construction, the motors constitute the main vehicle support and, as such, the truck body portion, which is supported by flexible elements on the wheel axles.

My present invention is directed to a special form of bearing structure, for mounting the motors constituting the truck body, which does not utilize the journal boxes commonly employed in truck structures and which effects a more efficient distribution of the loads on the supporting axles.

Figure 1:
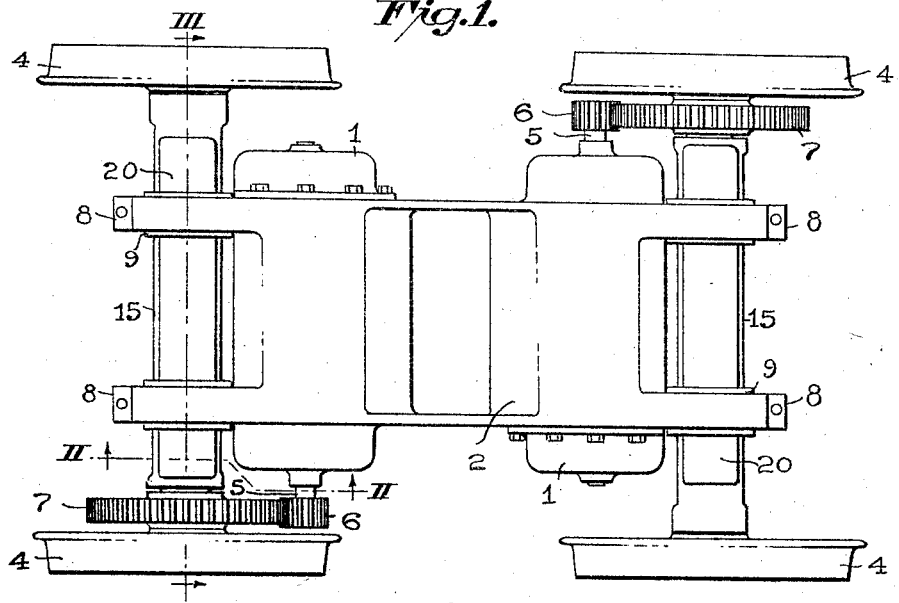
Figure 2:
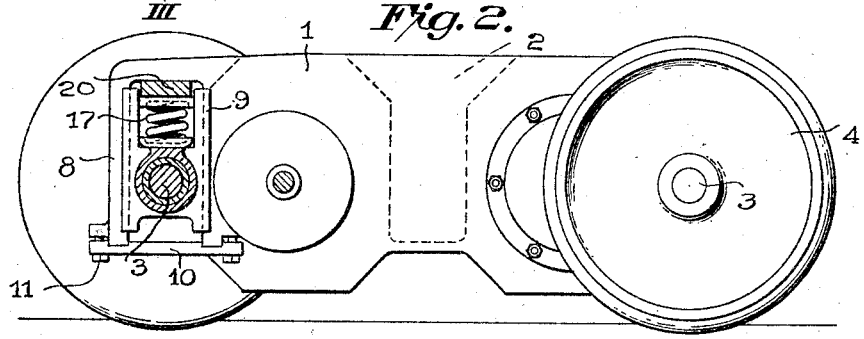
Figure 3:
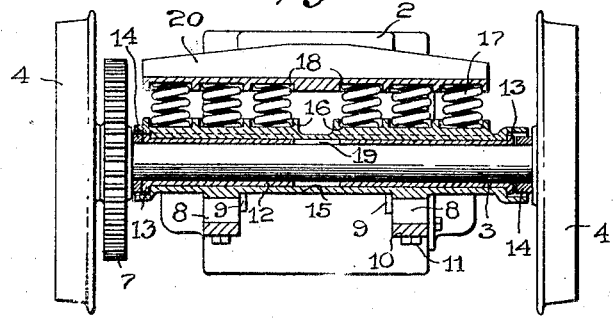

In the accompanying drawings constituting a part hereof and in which like reference characters designate like parts, Fig. 1 is a plan view of a vehicle truck embodying the principles of my invention, Fig. 2 is a side elevational view, partially in section, of the truck taken along the line II—II of Fig. 1, and Fig. 3 is a view partially in elevation and partially in section, taken approximately along the line III—III of Fig. 1.

The truck constitutes a plurality of motors 1, which are mounted in a unitary or integral housing 2. The housing 2 is supported on the car axles 3, which are provided with flanged wheels 4. The shafts 5 of the motors are connected to the axles 3 by suitable pinions and gear wheels 6 and 7, respectively.

The construction of the bearing shown in Figs. 2 and 3 and the manner of mounting the frame 2 thereon avoids the journal box construction heretofore employed, in that the ends of the housing 2 are provided with vertical pedestals 8 that are adapted to receive a sliding shoe block 9 in which the axle is mounted, and pedestal binders 10 are joined to the frame in the usual manner, as by bolts 11.

The bearing structure comprises a plurality of sleeves 12 having end flanges 13, which are journalled on the axles 3 of the wheels 4. The axles 3 are provided with collars 14 to limit the transverse movement of the axles by their engagement with the flanges 13 of the sleeves 12. An axle housing 15 is provided with spring seats 16 that are adapted to receive a plurality of coil springs 17, which are further positioned by the spring seats 18 of the girder 20 under the upper portion of the frame 2. The outer ends of the axle housing are projected over the flange 13 and collars 14 and are provided with the usual baffle flanges to prevent the escape of the lubricant, the axle-housing ends being constructed to exclude grit and dust from the bearing parts.

The sleeve members 12 are secured by a press-fit in the housings 15 and they are of such length as to provide a central space 19 that constitutes a lubricating chamber or oil reservoir, which may be supplied with lubricant in any suitable manner. The construction of the axle housing and the method of mounting the coil springs 17 thereon provide efficient load distribution over a relatively large bearing surface, that is, the load is carried on the axles along the entire surfaces of the bearing sleeves 12. This design provides a very substantial and rugged construction which eliminates breakage of the springs and bearing parts and, moreover, provides a better lubricating system than is found in prior structures.

Although I have described my invention as an embodiment of my new type of truck construction, as disclosed in the above-identified application, it is not restricted to this type of truck mounting, but may be applied to truck bodies embodying the usual side frame. It will, therefore, be obvious to those skilled in the art that various modifications may be made in the details of construction without departing from the principles herein set forth.

I claim as my invention:—

1. The combination, in a vehicle truck, of a supporting frame, a plurality of axle housings movably mounted therein, a plurality of sleeves carried by said housings for journalling wheel axles of said truck, and means for uniformly distributing the load of the truck body on said axles.

2. The combination, in a vehicle truck of a supporting frame and a plurality of axle housings, said axle housings having axle bearings extending along substantially the entire length of the axles, and said axle bearings and housings being arranged to carry the load of the truck on the bearings.

3. The combination, in a vehicle truck, of a supporting frame and a plurality of axle housings adapted to be vertically movable in said frame, a pair of bearing sleeves secured in each axle housing, and means for yieldingly mounting the truck frame on said housings.

4. The combination, in a vehicle truck, of a supporting frame and a plurality of axle housings adapted to be vertically movable in said frame, a pair of bearing sleeves secured in each axle housing, and a plurality of flexible elements interposed between said housings and the truck frame.

5. The combination, in a vehicle truck, of a supporting frame and a plurality of axle housings adapted to be vertically movable in said frame, a pair of bearing sleeves secured in each axle housing, and a plurality of flexible elements interposed between said housings and the truck frame, said sleeves and housings being arranged to provide a lubricating system for the wheel axles of the truck.

6. The combination, in a vehicle truck, of a supporting frame and a plurality of axle housings adapted to be vertically movable in said frame, a pair of bearing sleeves secured in each axle housing, and a plurality of flexible elements interposed between said housings and the truck frame, said sleeves and housings being arranged to enclose said bearings and provide a lubricating system for the wheel axles.

7. A railway vehicle truck comprising a plurality of bearing sleeves and a motor housing journalled on a plurality of wheel axles of the truck by means of said bearing sleeves.

8. A railway vehicle truck comprising a plurality of axle housings, a motor housing mounted on wheel axles of the truck by means of said axle housings, and a plurality of bearing sleeves movably mounted in the pedestal jaws of said motor housing.

9. A railway vehicle truck comprising a plurality of bearing sleeves, a motor housing journalled on a plurality of wheel axles of the truck by means of said bearing sleeves, and a plurality of coil springs interposed between said motor housing and said sleeves to resiliently carry the former.

In testimony whereof, I have hereunto subscribed my name this 18th day of September, 1923.

CLAUDE BETHEL.